United States Patent

Takayuki et al.

Patent Number: 6,105,471
Date of Patent: Aug. 22, 2000

[54] BOLT ATTACHING AND DETACHING DEVICE

[75] Inventors: Kawano Takayuki; Shimamoto Takijiro, both of Nagasaki, Japan

[73] Assignee: Mitsubishi Heavy Industries, Ltd., Tokyo, Japan

[21] Appl. No.: 09/227,194

[22] Filed: Jan. 8, 1999

[30] Foreign Application Priority Data

Jan. 12, 1998 [JP] Japan .................................. 10-003884

[51] Int. Cl.[7] .................................................. B25B 17/00
[52] U.S. Cl. ........................................ 81/57.38; 254/29 A
[58] Field of Search .................................. 81/57.38, 429; 254/29 A

[56] References Cited

U.S. PATENT DOCUMENTS 4,052,652  10/1977  Simnovec et al. .

FOREIGN PATENT DOCUMENTS

| 0 223 713 | 5/1987 | European Pat. Off. . |
|---|---|---|
| 2 519 161 | 7/1983 | France . |
| 61-297039 | 12/1986 | Japan . |
| 1-027824 | 1/1989 | Japan . |
| 7-217626 | 8/1995 | Japan . |
| 9-216133 | 8/1997 | Japan . |
| 9-219286 | 8/1997 | Japan . |

*Primary Examiner*—James G. Smith
*Attorney, Agent, or Firm*—Wenderoth, Lind & Ponack, L.L.P.

[57] ABSTRACT

Provided is bolt attaching and detaching device for fastening and loosening bolt by heating the bolt by bolt heater inserted into central hole of the bolt by which fastening and loosening of the bolt can be done automatically without need of operator to watch or attend always. Bolt heater (9) is inserted into bolt hole (3) of bolt (4) for fastening flanges (1, 2) together. Upper nut (5) in thread engagement with the bolt (4) is given rotational force by nut rotating device (11) via drive belt (13). Measured value of elongation indicator (10) for measuring thermal elongation of the bolt (4) and rotating angle detecting signal of the nut rotating device (11) as well as predetermined elongation amount of the bolt (4) and predetermined rotating angle of the upper nut (5) from condition setting unit (18 are given to control unit (17). The control unit (17) controls bolt heater power source (16) as well as controls the nut rotating device (11) so that the upper nut (5) rotates in the predetermined angle.

5 Claims, 3 Drawing Sheets

BOLT ATTACHING AND DETACHING DEVICE

BACKGROUND OF THE INVENTION

1. Field of the Invention

The present invention relates to a bolt attaching and detaching device for fastening and loosening a bolt, such as a turbine casing bolt of steam turbine while the bolt is being heated by a bolt heater.

2. Description of the Prior Art

In the prior art, a fastening and loosening work of a turbine casing bolt of steam turbine as one example is done such that a bolt heater is inserted into a central hole bored in the turbine casing bolt so as to heat the turbine casing bolt for elongation thereof by a thermal expansion.

That is, in case of a fastening work of the turbine casing bolt, while a nut is being fastened continuously corresponding to the elongation of the turbine casing bolt, rotating angle of the nut is watched and upon confirming that the nut has been rotated by a predetermined angle, then the heating is stopped. Or, an elongation indicator fitted to an end of the turbine casing bolt is watched continuously by an operator and when the elongation of the turbine casing bolt has reached to a predetermined elongation by the thermal expansion, the nut is fastened rotationally by use of a spanner etc. and then a power source for heating is cut.

Also, in case of a loosening work of the turbine casing bolt, while an operator is trying to rotate the nut of the turbine casing bolt with a spanner to confirm the loosening thereof, the turbine casing bolt is heated and when the nut starts to be loosened, the nut is further loosened with several rotations more and then the power source is cut.

In the prior art as mentioned above, there has been a need that an operator attends always and tries to rotate the nut with a spanner while the bolt is being heated. Also, there has been a fear of deterioration of the bolt if the bolt is heated excessively with a negligence of watching of the operator.

SUMMARY OF THE INVENTION

In view of the problem in the prior art, it is an object of the present invention to provide a bolt attaching and detaching device for fastening and loosening a bolt by heating the bolt by a bolt heater inserted into a central hole of the bolt, which is able to do such fastening and loosening of the bolt automatically without a need of operator to watch and attend always. It is also an object of the present invention to provide a bolt attaching and detaching device which is able to do the fastening and loosening of the bolt with a high accuracy.

In order to attain said objects, the present invention provide a bolt attaching and detaching device comprising a nut rotating device for rotating a nut in a thread engagement with said bolt, an elongation indicator for measuring a thermal elongation of said bolt and a control unit for controlling a drive of said nut rotating device and a power supply to said bolt heater.

Said control unit comprises at least one of a means for activating said nut rotating device so as to effect a fastening and a loosening of said nut as well as for cutting a power supply to said bolt heater when a measured value of said elongation indicator comes to a predetermined elongation, a means, in case said nut is to be fastened, for keeping to give a rotational force on said nut and for stopping said nut rotating device as well as for cutting the power supply to said bolt heater when said nut rotates in a predetermined angle and a means, in case said nut is to be loosened, for rotating said nut with a predetermined number of rotations when said nut is loosened to be rotatable and then for stopping said nut rotating device as well as for cutting the power supply to said bolt heater.

According to the bolt attaching and detaching device of the present invention constructed as mentioned above, the bolt is heated by the bolt heater to elongate and when this thermal elongation comes to a predetermined value, the elongation indicator which measures the thermal elongation of the bolt gives a signal thereof so that the control unit detects this signal and activates the nut rotating device. Thus, the fastening or the loosening of the nut is done automatically as well as the power supply to the bolt heater is cut.

And, in case the bolt is to be fastened, when the nut rotates in an angle predetermined at the time of designing, the control unit causes the nut rotating device to stop as well as cuts the power supply to the bolt heater.

On the other hand, in case the bolt is to be loosened, when the bolt is heated by the bolt heater to elongate so that the nut is loosened to be rotatable, the nut is rotated with a predetermined number of rotations and then the nut rotating device is stopped as well as the power supply to the bolt heater is cut.

Thus, according to the bolt attaching and detaching device of the present invention, the fastening and the loosening of the bolt can be done automatically without a need of operator to watch the elongation of the bolt and the rotating angle of the nut.

The nut rotating device used in the bolt attaching and detaching device of the present invention is constructed preferably so as to give an impulsive rotational force on the nut, then a large force can be given on the nut in case the nut is to be loosened.

Further, in the bolt attaching and detaching device of the present invention, it is preferable that at least one of said means comprised in said control unit comprises an alarming means for generating an alarm signal at the time of starting or finishing of an action of that means, such as, in case the nut is to be fastened, when the rotating angle of the nut has come to a predetermined value and when the elongation of the bolt has come to a predetermined value, and in case the nut is to be loosened, when the nut has become rotatable, when the rotation of the nut has come to a predetermined number of rotations and when the power supply to said bolt heater has been cut.

By employing such construction, in the work of fastening or loosening the bolt, progress of the process is kept known to the operator, thereby a bolt attaching and detaching device in which work sharing can be done efficiently is provided.

DESCRIPTION OF THE PREFERRED EMBODIMENTS

Figure 1:
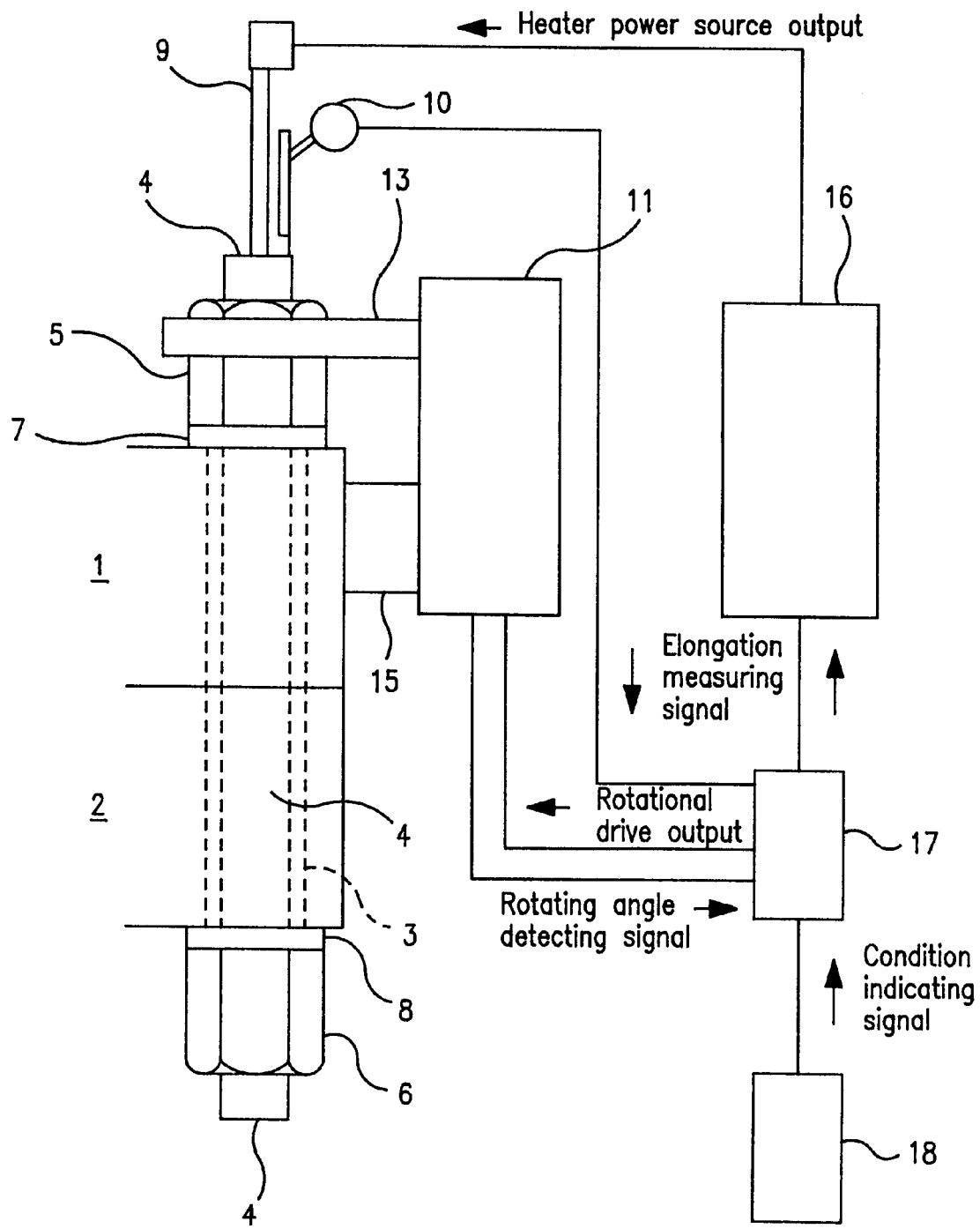
FIG. 1 is an explanatory view showing a bolt attaching and detaching device of a first embodiment according to the present invention.
Figure 2:
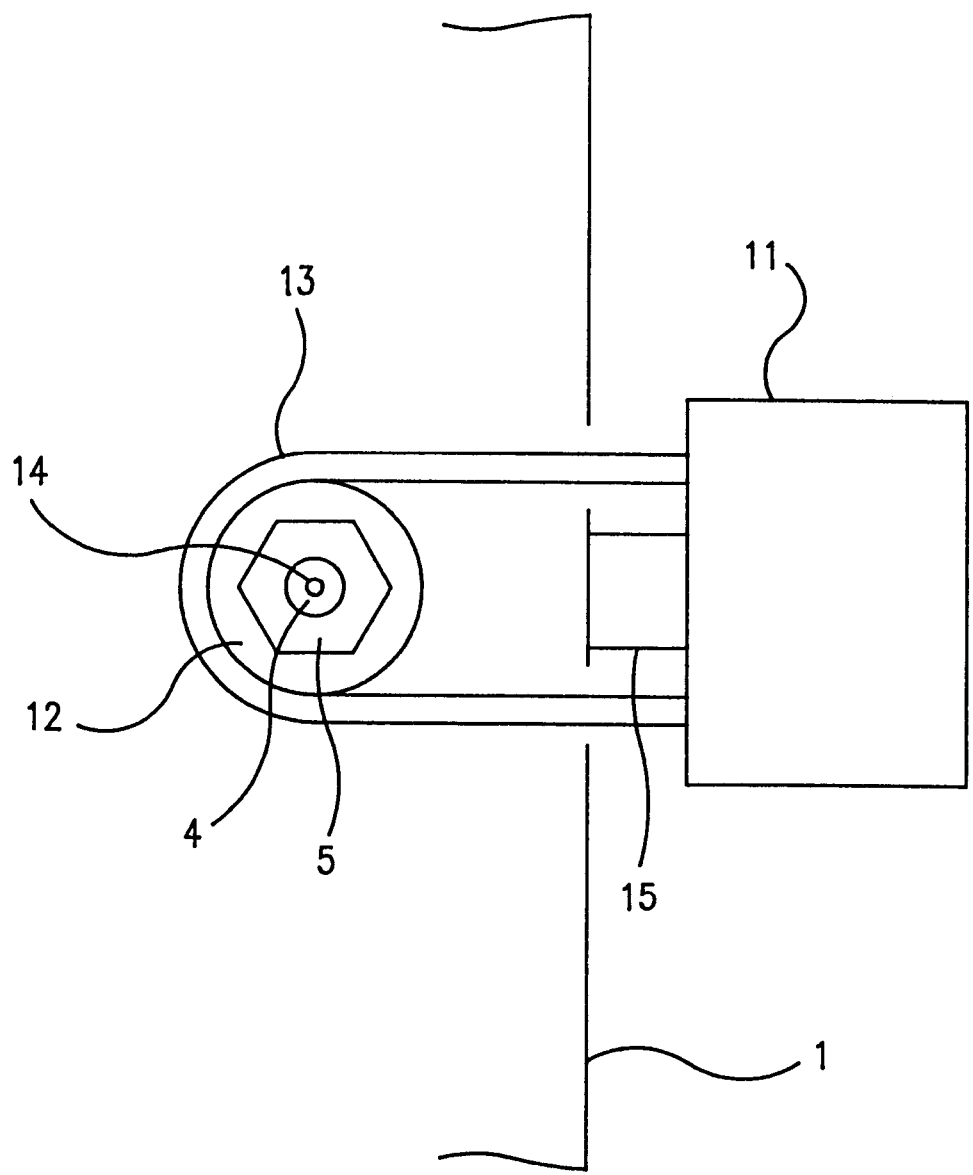
FIG. 2 is a plan view of a bolt portion of the device of FIG. 1.
Figure 3:
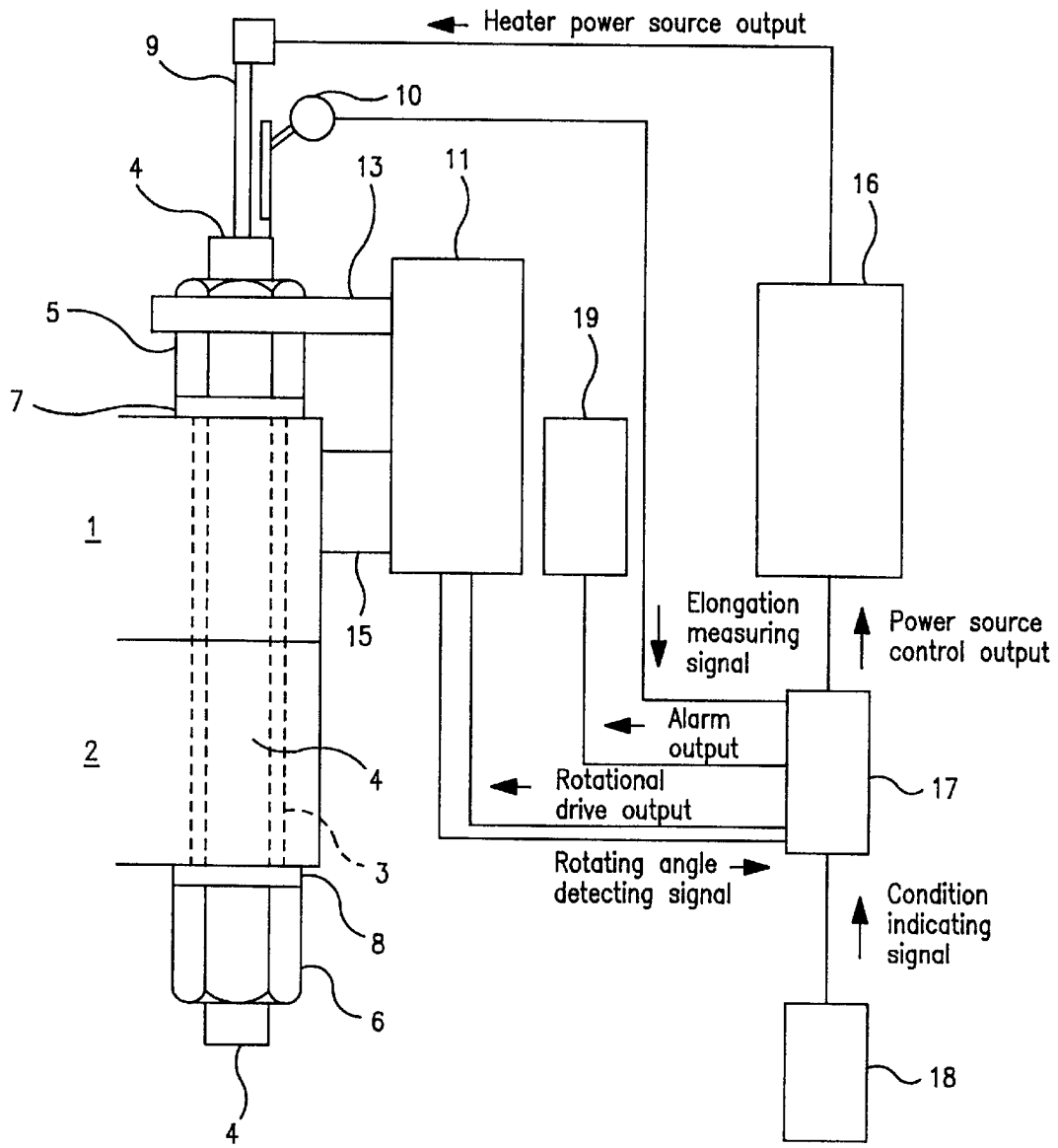
FIG. 3 is an explanatory view showing a bolt attaching and detaching device of a second embodiment according to the present invention.

Herebelow, description will be made concretely on embodiments of bolt attaching and detaching devices of the present invention with reference to FIGS. 1 to 3. It is to be noted that same structural parts are shown with same reference numerals in the figures.

(First Embodiment)

Firstly, a bolt attaching and detaching device shown in FIGS. 1 and 2 of a first embodiment according to the present invention will be described. In FIGS. 1 and 2, numerals 1, 2 designate flanges, respectively, to be fastened together by a bolt and numeral 3 designates a bolt hole bored in the flanges 1, 2. Numeral 4 designates a bolt for fastening the flanges 1, 2 together. Numerals 5, 6 designate an upper nut and a lower nut positioned at an upper portion and a lower portion of the bolt 4, respectively, via a thread engagement between the nut and the bolt.

In the bolt 4, there is bored a hole 14 passing through the bolt 4 along an axis thereof for inserting thereinto a bolt heater. Numerals 7, 8 designate washers interposed between the nuts 5, 6 and the flanges 1, 2, respectively. Numeral 9 designates a bolt heater, which is inserted into the hole 14 of the bolt 4 along a substantially entire length of the bolt 4. When the bolt 4 is to be attached or detached, the bolt 4 is heated from its interior by the bolt heater 9.

Numeral 10 designates an elongation indicator for measuring an elongation of the bolt 4 caused by heating done by the bolt heater 9 when the bolt 4 is to be attached or detached. Numeral 11 designates a nut rotating device, which is driven electrically or hydraulically for rotating the upper nut 5. The nut rotating device 11 is fixed to the flange 1 via a fixing jig 15 but it may be fixed not necessarily to the flange 1 but to appropriate metal fittings etc.

Numeral 12 designates a nut rotating wheel, which is fitted around the upper nut 5. Numeral 13 designates a drive belt, which constitutes a part of the nut rotating device 11, for transmitting a drive force of the nut rotating device 11. In the present embodiment, the drive belt 13 is used but other drive force transmission means, such as a chain or a gear, may be used.

Numeral 16 designates a bolt heater power source. Numeral 17 designates a control unit, which receives a signal from the elongation indicator 10, a rotating angle detecting signal and a condition indicating signal and controls a drive of the nut rotating device 11 and a power supply to the bolt heater 9 from the bolt heater power source 16. Numeral 18 designates a condition setting unit, which sets conditions of a nut rotating angle, a power source output condition, etc. and sends the conditions so set to the control unit 17.

Function of the device of FIGS. 1 and 2 having the above-mentioned construction will be described. Firstly, in case of fastening the bolt 4, with a power being supplied to the bolt heater 9 from the bolt heater power source 16, the bolt 4 is heated by the bolt heater 9 to elongate due to the thermal expansion. A drive force to rotate the upper nut 5 is given on the upper nut 5 by the nut rotating device 11 via the drive belt 13 and the nut rotating wheel 12.

Rotating force of the nut rotating device 11 is not as high as to fasten the bolt 4 but is such a drive force as to rotate the upper nut 5 idly and the upper nut 5 is rotated gradually as the bolt 4 expands. At this time, the elongation of the bolt 4 is measured by the elongation indicator 10 and the rotating angle of the upper nut 5 is detected by the nut rotating device 11.

Necessary elongation amount of the bolt 4 or necessary rotating angle of the nut, which is equivalent to the elongation amount, are predetermined at the time of designing and a value thereof is set by the condition setting unit 18 beforehand. When the bolt 4 comes to the predetermined elongation amount or the upper nut 5 rotates in the predetermined rotating angle, the nut rotating device 11 is stopped by the control unit 17 and the power supplied from the bolt heater power source 16 is stopped.

Next, in case of loosening the bolt 4, the bolt 4 is likewise heated by the bolt heater 9 to elongate and when the upper nut 5 is loosened and starts to rotate, the nut rotating device 11 is stopped and the power from the bolt heater power source 16 is stopped. It is to be noted that, as to the measuring of the elongation amount of the bolt 4, although the method of measuring by the elongation indicator 10 or measuring of the rotating angle of the upper nut 5 has been described, construction of the actual device may be such as to include one of them only.

As to the construction of the nut rotating device 11 for rotating the upper nut 5, it is also effective that the nut rotating device 11 not only gives such a drive force as a continuous rotating force but also may give an impulsive rotating force according to a case, especially in case the bolt 4 is loosened slightly. According to the bolt attaching and detaching device of the present embodiment described as above, fastening and loosening of the bolt can be done automatically without a need of operator to watch or wait.

(Second Embodiment)

Next, a bolt attaching and detaching device of a second embodiment shown in FIG. 3 will be described. In FIG. 3, numeral 19 designates an alarm generator. Other portion of the construction is substantially same as that of the first embodiment.

The alarm generator 19 gives an alarm by sound or light upon signal from the control unit 17 at the time of starting and finishing of various actions indicated by the control unit 17, such as, in case of fastening the nut, when the rotating angle of the upper nut 5 has come to a predetermined value or the elongation of the bolt 4 has come to a predetermined value, and in case of loosening the nut, when the upper nut 5 has become rotatable, the rotation of the upper nut 5 has come to a predetermined number, the power from the bolt heater power source 16 has been cut, etc.

Thus, according to the device of the second embodiment, in addition to the function and effect of the device of the first embodiment, the operator can always confirm the progress of work despite in a noisy and congested work site of a power plant turbine chamber where installation work or overhauling work is being carried out and an efficient work sharing becomes possible.

As a summary of the effect of the present invention, because the present invention provides a bolt attaching and detaching device for fastening and loosening a bolt by heating the bolt using a bolt heater inserted into a central hole of the bolt, comprising a nut rotating device for rotating a nut in thread engagement with the bolt, an elongation indicator for measuring a thermal elongation of the bolt and a control unit for controlling a drive of the nut rotating device and a power supply to the bolt heater, thus fastening and loosening of the bolt can be done by the nut rotating device automatically with a control by the control unit and there is no need of an operator to watch the elongation of the bolt and the rotating angle of the nut.

Therefore, while the bolt is being attached or detached, the operator can engage in another work without attending always in a narrow work place. Also, the bolt is heated to a needed extent only with no deterioration of the bolt being caused due to excess heating, rotation of the nut can be done precisely and accuracy of the fastening force also can be enhanced.

Further, in the bolt attaching and detaching device of the present invention which is constructed to include an alarming means for generating an alarm signal upon starting or finishing of at least one action of the means constituting the control unit, the progress of the work process done by the bolt attaching and detaching device can be confirmed from time to time and an efficient work sharing becomes possible.

It is understood that the invention is not limited to the particular construction and arrangement herein illustrated and described but embraces such modified forms thereof as come within the scope of the following claims.

What is claimed is:

1. A bolt attaching and detaching device for fastening and loosening a bolt by heating the bolt by a bolt heater inserted into a central hole of the bolt, comprising a nut rotating device for rotating a nut in a thread engagement with said bolt attached fixedly, an elongation indicator for measuring a thermal elongation of said bolt and a control unit for controlling a drive of said nut rotating device and a power supply to said bolt heater, wherein said control unit comprises at least one of a means for activating said nut rotating device so as to effect a fastening and a loosening of said nut as well as for cutting a power supply to said bolt heater when a measured value of said elongation indicator comes to a predetermined elongation, a means, in case said nut is to be fastened, for keeping to give a rotational force on said nut and for stopping said nut rotating device as well as for cutting the power supply to said bolt heater when said nut rotates in a predetermined angle and a means, in case said nut is to be loosened, for rotating said nut with a predetermined number of rotations when said nut is loosened to be rotatable and then for stopping said nut rotating device as well as for cutting the power supply to said bolt heater.

2. A bolt attaching and detaching device as claimed in claim 1, wherein said nut rotating device comprises a means to give an impulsive rotational force on the nut.

3. A bolt attaching and detaching device as claimed in claim 1, wherein at least one of said means comprised in said control unit comprises an alarming means for generating an alarm signal at the time of starting or finishing of an action of that means.

4. A bolt attaching and detaching device as claimed in claim 3, wherein generation of the alarm signal by said alarming means is done at at least one of the times, in case the nut is to be fastened, when the rotation angle of the nut has come to a predetermined value and when the elongation of the bolt has come to a predetermined value, and in case the nut is to be loosened, when the nut has become rotatable, when the rotation of the nut has come to a predetermined number of rotations and when the power supply to said bolt heater has been cut.

5. A bolt attaching and detaching device as claimed in claim 2, wherein at least one of said means comprised in said control unit comprises an alarming means for generating an alarm signal at the time of starting or finishing of an action of that means.

* * * * *